United States Patent
Nagayama et al.

(10) Patent No.: US 9,004,899 B2
(45) Date of Patent: Apr. 14, 2015

(54) NOODLES AND APPARATUS FOR PROCESSING THE SAME

(75) Inventors: Yoshiaki Nagayama, Gunma (JP); Takeshi Youda, Gunma (JP)

(73) Assignee: Sanyo Foods Co., Ltd., Tokyo (JP)

(*) Notice: Subject to any disclaimer, the term of this patent is extended or adjusted under 35 U.S.C. 154(b) by 315 days.

(21) Appl. No.: 13/367,716

(22) Filed: Feb. 7, 2012

(65) Prior Publication Data
US 2013/0202765 A1  Aug. 8, 2013

(51) Int. Cl.
| A21C 11/24 | (2006.01) |
| A21C 11/22 | (2006.01) |
| A23L 1/16 | (2006.01) |
| B26D 1/25 | (2006.01) |
| B26D 7/26 | (2006.01) |

(52) U.S. Cl.
CPC . *A21C 11/24* (2013.01); *A23L 1/16* (2013.01); *B26D 1/255* (2013.01); *B26D 7/2635* (2013.01)

(58) Field of Classification Search
CPC ............................... A21C 11/24; A21C 11/22
USPC ........... 425/292, 294, 307, 310, 202, 235, 76; 426/518; 83/500, 503
See application file for complete search history.

(56) References Cited

U.S. PATENT DOCUMENTS

| 3,225,718 | A | * | 12/1965 | Page | 425/101 |
| 3,932,089 | A | * | 1/1976 | Ando | 425/294 |
| 4,072,454 | A | * | 2/1978 | Jen-Shuy | 425/101 |
| 4,083,668 | A | * | 4/1978 | Bardwick et al. | 425/194 |
| 4,302,478 | A | * | 11/1981 | Hamann et al. | 426/517 |
| 4,311,719 | A | * | 1/1982 | Falconi | 426/557 |
| 4,732,083 | A | * | 3/1988 | Arter et al. | 101/28 |
| 5,162,119 | A | * | 11/1992 | Pappas et al. | 425/92 |
| 6,174,556 | B1 | * | 1/2001 | Bornhorst et al. | 426/503 |
| 6,902,754 | B1 | * | 6/2005 | Evans et al. | 426/503 |
| 2004/0013770 | A1 | * | 1/2004 | Evans et al. | 426/76 |
| 2012/0064187 | A1 | * | 3/2012 | Ishii et al. | 425/306 |

FOREIGN PATENT DOCUMENTS

| JP | 6-38663 A | 2/1994 | |
| JP | 2000-116310 A | 4/2000 | |
| JP | 2011-109959 A | 6/2011 | |
| WO | WO 2010140385 A1 * | 12/2010 | A21C 11/24 |
| WO | WO 2010146635 A1 * | 12/2010 | A21C 11/24 |

* cited by examiner

*Primary Examiner* — Seyed Masoud Malekzadeh
(74) *Attorney, Agent, or Firm* — Holtz, Holtz, Goodman & Chick PC

(57) ABSTRACT

Noodles with hand-made quality consisting of thick and thin portions are processed by introducing a noodle belt between first and second cutting rolls 5 and 6 having first and second cutting blades 3 and 4 each formed by large and small diameter portions 3a, 4a and 3b and 4b, and spacers 7. The cutting rolls are relatively shifted in an axial direction such that the thick portion is formed by opposing large diameter portion and spacer and the thin portion is formed by opposing large diameter portion and small diameter portion.

9 Claims, 3 Drawing Sheets

NOODLES AND APPARATUS FOR PROCESSING THE SAME

BACKGROUND OF THE INVENTION

1. Field of the Invention

The present invention relates to noodles having a handmade-like quality and an apparatus for producing the same.

2. Related Art Statements

It has been known that noodles having a thickness varied in a longitudinal direction have a handmade-like quality. In Japanese Patent Application Laid-open Publications Kokai-Hei 6-38663 and Kokai 2000-116310, there have been proposed known apparatuses for making such noodles having a handmade-like quality. In the known apparatuses, a special pressing or molding roll set is used to make a flattened noodle belt whose thickness varied in a longitudinal direction. After forming the noodle belt, the flattened noodle belt is cut into fine noodles with the aid of a conventional cutting roll set.

In the known noodle processing apparatuses, a series of plural pressing roll sets are provided. In order to make the noodle belt having a thickness varying in the longitudinal direction, one or more pressing roll sets must be replaced by one or more special pressing roll sets. However, this replacing work is very difficult and consumes a longer time. Therefore, an efficiency of the processing line forming a plural kinds of noodles is decreased.

In usual noodle producing factories, a plural kinds of noodles are processed in a single processing line. It is required to change the processing line between plural kinds of noodles in an easy and prompt manner.

SUMMARY OF THE INVENTION

The present invention has for its object to provide a noodle having a handmade-like quality, and to provide an apparatus for processing such noodle without using the special pressing roll set.

According to the invention, a noodle with a handmade-like quality, wherein the noodle is consisting of a thick portion extending in a longitudinal direction and a thin portion extending in the longitudinal direction, and said thick and thin portions are continuously coupled with each other such that one surface of said thick portion and one surface of said thin portion are aligned to form a substantial flat surface.

According to further aspect of the invention, an apparatus for processing noodles with a hand-made like quality consisting of a thick portion extending in a longitudinal direction and a thin portion extending in the longitudinal direction, and that said thick and thin portions are continuously coupled with each other such that one surface of said thick portion and one surface of said thin portion are aligned to form a substantial flat surface, comprising a first cutting roll including a first roll shaft and a plurality of first cutting blades arranged on said first roll shaft such that spaces of a given distance are formed between successive first cutting blades, a second cutting roll including a second roll shaft and a plurality of second cutting blades arranged on said second roll shaft such that spaces of a given distance are formed between successive second cutting blades, said first and second cutting rolls being arranged in parallel with each other with a predetermined distance such that when a noodle belt having a given width is introduced between the first and second cutting rolls, the noodle belt is cut into a number of fine noodles, wherein each of said first and second cutting blades including a large diameter portion and a small diameter portion, and said first and second cutting rolls are relatively shifted in an axial direction such that each of the large diameter portions of the first cutting blades faces each of the small diameter portions of the second cutting blades, each of said spaces of a given distance and each of the large diameter portions of the second cutting blades faces each of the small diameter portions of the first cutting blades and said space of a given distance, and the noodle belt is cut into fine noodles by cooperation of adjacent edges of the large diameter portions of the first and second cutting blades.

In the noodle according to the invention, the thick portion gives superior chewiness to the noodle and the thin portion gives better matching with a soup, and therefore the noodles have excellent hand-made like quality. Since the thick and thin portions of the noodle are extending in a longitudinal direction and are aligned in a width direction of the noodle, the noodle can be easily formed by the cutting blades having large diameter portions and small diameter portions. Moreover, the cutting rolls of the present invention can be easily substituted for the conventional cutting roll set within a short time period, and thus various kinds of noodles can be processed by a single process line with a high efficiency.

Figure 1:
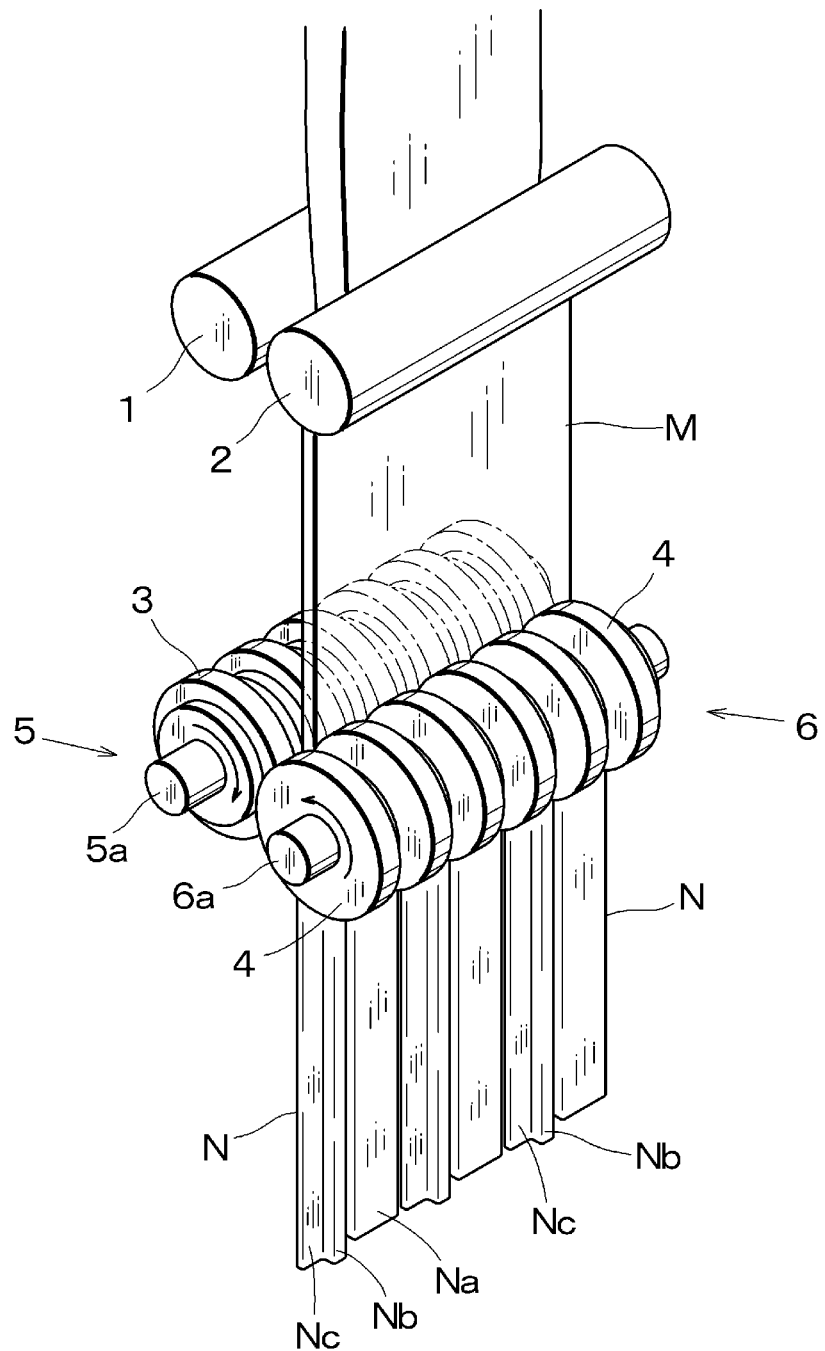
FIG. 1 is a schematic perspective view showing a first embodiment of a cutting roll set of the noodle processing apparatus according to the invention.

In the drawings, reference numerals 1, 2 denote pressing roll, 3, 4 cutting blade, 3a, 4a large diameter portion, 3b, 4b small diameter portion, 5, 6 cutting roll, spacer, M noodle belt, N noodle, Na flat portion, Nb thick portion, and a reference figure Nc denotes thin portion.

DESCRIPTION OF THE PREFERRED EMBODIMENTS

Embodiment 1

The noodle according to the invention is processed by cutting a noodle belt. The noodle belt may be processed in the following manner. A wheat flour of 900 gr and a potato starch of 100 gr are mixed with a solution containing a water of 330 ml, a sodium carbonate of 3 gr and a salt of 10 gr and a mass of these materials is kneaded to obtain dough. Then, the dough thus obtained is pressed by molding or pressing roll sets. Such a process has been widely known in the relevant art, and therefore a more detailed explanation is dispensed with.

FIG. 1 is a perspective view showing a pressing roll set 1, 2 and a cutting roll set 5, 6 of the first embodiment of the noodle processing apparatus according to the invention. For the sake of simplicity, the pressing roll set 1, 2 and cutting roll set 5, 6 are shown to have a smaller axial length than an actual axial length. In an actual apparatus, much longer roll sets are used to make a much larger number of fine noodles simultaneously. It should be noted that the pressing roll set 1, 2 shown in FIG. 1 is the last one in a series of pressing roll sets. The dough is successively processed by these pressing roll sets to make the noodle belt M. The series of pressing roll sets are designed such that the noodle belt M supplied from the last pressing roll set 1, 2 has a predetermined thickness such as 0.5-0.8 mm. The noodle belt M thus obtained is supplied into a spaced formed between the first and second cutting rolls 5 and 6 each having a plurality of cutting blades 3 and 4 arranged around roll shafts 5a and 6a of the first and second cutting rolls 5 and 6, respectively.

Figure 2:
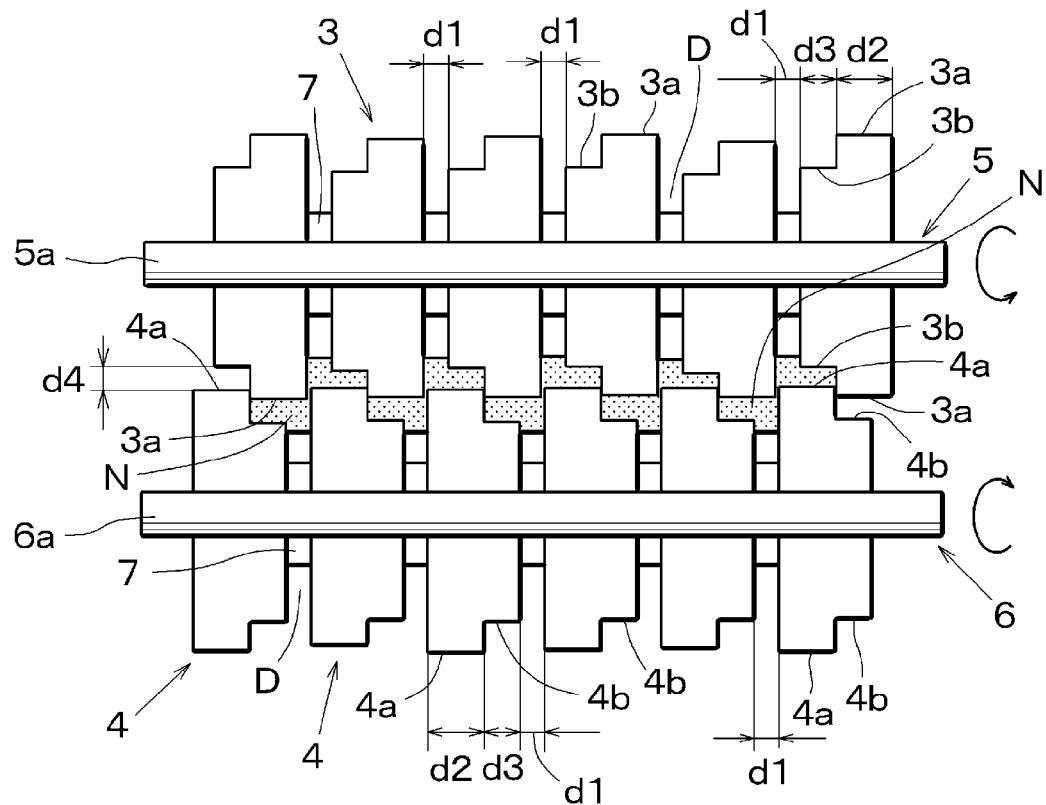
FIG. 2 is a schematic cross sectional view of the cutting roll set.

FIG. 2 is a schematic cross sectional view illustrating a cutting roll set 5, 6. Between successive cutting blades 3 of the first cutting roll 5 are arranged spacers 7 having a thickness d1 of 1.5 mm. Therefore, there are formed spaces D between successive cutting blades 3. Similarly, spacers 7 are arranged between successive cutting blades 4 of the second cutting roll 6 to form spaces D of 1.5 mm between successive cutting blades 4. Each of the cutting blades 3 is consisting of a larger diameter portion 3a having a length d2 of 3.0 mm and a small diameter portion 3b having a length d3 of 1.5 mm, and similarly each of the cutting blades 4 is consisting of a larger diameter portion 4a having a length of d2 and a small diameter portion 4b having a length of d3.

The cutting blades 3 of the first cutting roll 5 are secured to the roll shaft 5a such that the larger diameter portions 3a face toward rightward in the drawing of FIG. 2 and the cutting blades 4 of the second cutting roll 6 are secured to the roll shaft 6a such that the small diameter portions 4b face toward right ward. That is to say, the cutting blades 3 and 4 are arranged in opposite directions. Furthermore, the first and second cutting rolls 5 and 6 are arranged such that the larger diameter portion 3a of the first cutting blade 3 faces the small diameter portion 4b and spacer 7 of the second cutting blade 4 viewed in the radial direction and the larger diameter portion 4a of the second cutting blade 4 faces the small diameter portion 3b and spacer 7 of the first cutting roll 5 viewed in the radial direction.

Furthermore, the first and second cutting rolls 5 and 6 are arranged such that the larger diameter portions 3a of the first cutting blades 3 are slightly inserted into spaces formed between successive larger diameter portions 4a of the second cutting blades 4, and the larger diameter portions 3a of the first cutting blades 3 are separated from the small diameter portions 4b of the second cutting blades 4 by a predetermined distance d4 viewed in the radial direction. It should be noted that the small diameter portions 3b of the first cutting blades 3 are separated from the larger diameter portions 4a of the second cutting blades 4 by the same distance d4 viewed in the radial direction. In this case, distance d4 should be slightly smaller than a thickness of the noodle belt M.

The cutting rolls 5 and 6 having the cutting blades 3 and 4 are rotated at a constant speed in opposite directions as shown in FIG. 2 such that the noodle belt M introduced between the first and second cutting rolls 5 and 6 is fed downward. Then, the noodle belt M is cut into a number of fine noodles N by means of inner edges of the large diameter portions 3a and 4a of the cutting blades 3 and 4 and outer edges of the larger diameter portions 3a and 4a of the cutting blades 3 and 4. It should be noted that spaces between these inner edges and outer edges of the cutting blades 3 and 4 are extremely small, the noodle belt M could not be inserted into these spaces. In this manner, two fine noodles N are obtained between radially opposing cutting blades 3 and 4.

Figure 3:
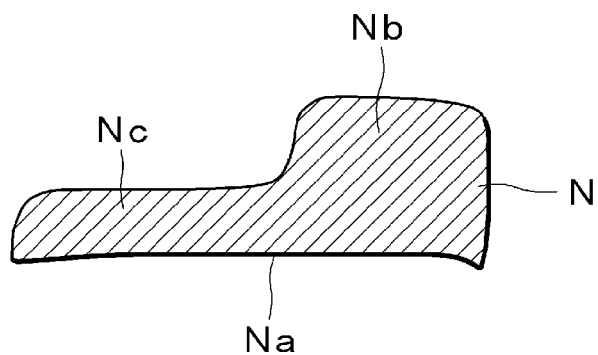
FIG. 3 is a cross sectional view of the noodle processed by the first embodiment of the noodle processing apparatus according to the invention.

FIG. 3 is a cross sectional view showing the fine noodle N processed by the noodle making apparatus of the present embodiment. The noodle N has a substantially flat surface Na formed by the large diameter portion 3a, 4a of the cutting blades 3, 4 and is composed of a thick portion Nb and a thin portion Nc. The thin portion Nc is formed by the large diameter portion 3a and the small diameter portion 4b or by the small diameter portion 3b and the large diameter portion 4a. The thick portion Nb of the noodle N is formed by extruding a mass of the noodle belt M by means of the cutting blades 3 and 4 into the space D formed between successive blades 3 and 4, respectively. In this manner, a width of the flat surface Na is determined by the length d2 of the large diameter portion 3a, 4a of the cutting blades 3, 4, a width of the thick portion Nb is determined by the length d1 of the spacer 7 and a width of the thin portion Nc is determined by the length d3 of the small diameter portion 3b, 4b of the cutting blade 3, 4. Furthermore, a thickness of the thin portion Nb of the noodle N is determined by the distance d4 between mutually opposing large diameter portion 3a of the cutting blade 3 and the small diameter portion 4b of the cutting blade 4. It should be noted that a length of the thick portion Nb of the noodle N is determined mainly by a thickness of the noodle belt M, the distance d4 and the length d1 of the spacer 7.

The widths of the thick portion Nb and thin portion Nc of the fine noodle N can be adjusted by changing the distance d4 between radially opposing cutting blades 3 and 4. In the present embodiment, a width of the noodle N is 3.0 mm, a width and a thickness of the thick portion Nb are set to 1.5 mm and 1.2 mm, respectively, and a width and a thickness of the thin portion Nc are set to 1.5 mm and 0.35 mm, respectively. Then, a volume ratio of the thick portion Nb with respect to the thin portion Nc becomes 10:3.4. According to the invention, it has been experimentally confirmed that a volume ratio may be preferably set to a value within a range of 10:5 to 10:1.

As explained above, a width of the thick portion Nb of the noodle N may be changed by varying the length d1 of the spacer 7. Furthermore, a thickness of the thick portion Nb of the noodle N may be defined by the outer surface of the spacer 7. It should be noted that according to the invention, the spacer may be formed as a single integral body together with the cutting blade 3, 4.

According to the invention, the volume ratio of the thick portion Nb and thin portion Nc of the noodle N is large, and therefore the fine noodles N cut out by the cutting roll set 5, 6 are liable to be naturally twisted to give the handmade-like quality. This handmade-like quality is further enhanced by boiling the noodles N.

The fine noodles N thus processed are then boiled by steam under a steam pressure of 0.5 kg/cm$^2$ for three minutes, and are cut into clumps each having a weight of 115 gr. The successively processed clumps are then put into drying frames, and then the drying frames are successively fed into a drying machine for forty minutes, a temperature within the drying machine being set to 80° C. and a wind flow speed within the drying machine being to 4 m/s. Finally, it is possible to make instant Chinese noodles with a wet content of 10%.

Embodiment 2

Figure 4:
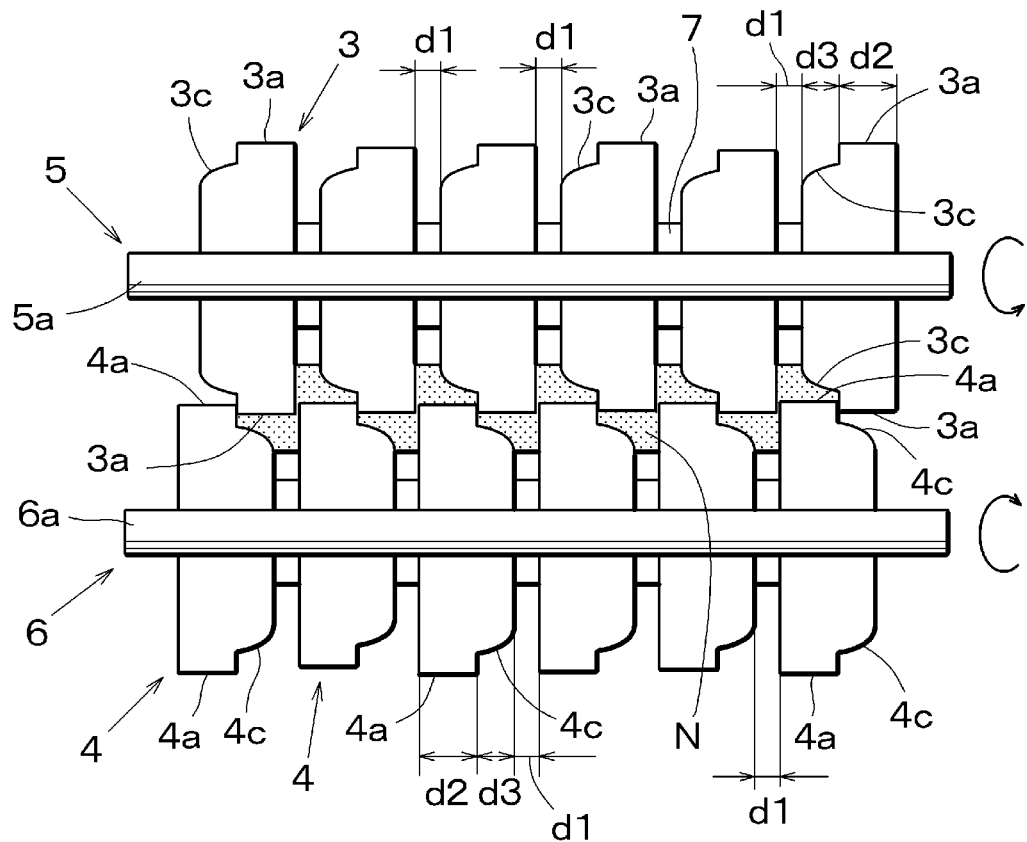
FIG. 4 is a cross sectional view depicting a second embodiment of cutting roll set according to the invention.

FIG. 4 is a schematic cross sectional view showing the cutting roll set of a second embodiment of the noodle processing apparatus according to the invention. In FIG. 4, portions similar to those illustrated in FIG. 2 are denoted by the same reference numerals used in FIG. 2. In the first embodiment depicted in FIG. 2, each of the large diameter portion 3a and 4a and small diameter portions 3b and 4b of the cutting blades 3 and 4 has a cylindrical shape, and therefore the thick portion and thin portion of the noodle have substantially uniform thicknesses to form a steep step-like transition between the thick portion and thin portion. In the present embodiment, each of the small diameter portions 3c and 4c of the cutting blades 3 and 4 has a curved surface, and thus the thin portion of the noodle N has a non-uniform thickness which gradually increases from a minimum value at a free edge of the thin portion to a maximum value at the junction with the thick portion. The maximum value is substantially equal to a thickness of the thick portion and a smooth transition is formed between the thin portion and thick portion.

Figure 5:
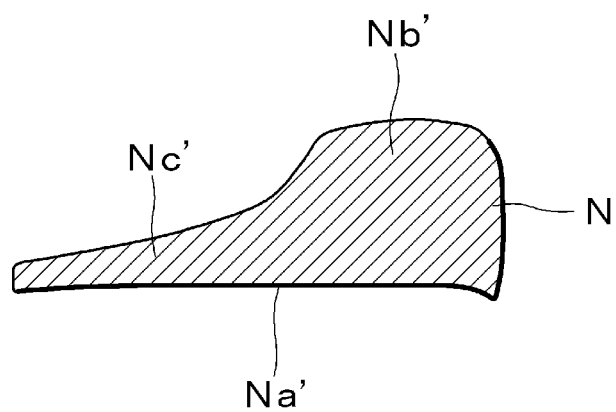
FIG. 5 is a cross sectional view showing a cross sectional configuration of a noodle processed by the cutting roll set of the second embodiment.

When the noodle belt M is fed into the cutting roll set 5, 6, it is possible to make a fine noodle N having a cross sectional configuration shown in FIG. 5. A fine noodle N is consisting of a thick portion Nb' and a thin portion Nc', these portions being coupled together to form one flat surface Na' and the uneven surface. The thick portion Nb' has a width of 1.5 mm and a thickness of 1.2 mm, and the thin portion Nc' has a width of 1.5 mm and a thickness varying continuously from 0.2 mm to 1.2 mm.

The fine noodles thus processed are dried under the same condition as that of the first embodiment to obtain finally instant Chinese noodles with a water content of 10%.

Fine noodles of the above mentioned first and second embodiments as well as a comparative example were subjected to a sensory evaluation test. The noodles of the comparative example were formed in the following manner. At first, dough was formed using the same material as that of the first embodiment, then the dough was pressed to form a noodle belt having a uniform thickness of 1.2 mm, and finally the noodle belt was cut by conventional polygonal blades each having ten corners into fine noodles.

In the sensory evaluation test, a mass having a weight of 70 gr of each of the noodles of the first and second embodiments according to the invention and the comparative example was put in a polystyrene cup having a water level line of 510 ml and a hot water of 100° C. was poured into the cup up to the water level line, and then the cup was closed by a cap of an aluminum foil to reconstitute the noodles. After five minutes, a soup was poured into the cup. Then, ten experienced monitors ate the thus reconstituted noodles and conducted the sensory evaluation test with ten grade scales. The results of the sensory evaluation test are represented in the following table 1.

TABLE 1

|  | A | B | C | D | E | F |
|---|---|---|---|---|---|---|
| Embodiment 1 | 8 | 10 | 10 | 10 | 6 | 6 |
| Embodiment 2 | 10 | 10 | 10 | 10 | 10 | 10 |
| Comparative Example | 2 | 1 | 1 | 1 | 1 | 3 |

In the above table 1, the item A denotes the chewiness, B the smoothness (texture), C the reconstitution with a hot water, D the matching with a soup. E the feeling of hand-made noodles, and the item F represents the looseness.

As can be understood from the table 1, the noodles of the first and second embodiments according to the invention have superior chewiness and reconstitution with a hot water to the noodles of the comparative example. This is due to a fact that the noodles N according to the invention have a smaller cross sectional area than the noodles of the comparative example to improve the reconstitution property, and at the same time the noodles according to the invention have the thick portions to improve the chewiness. In this manner, the noodles according to the invention can solve the mutually conflicting problems simultaneously. The conventional noodles of the comparative example have a poor reconstitution, and therefore the chewiness is also degraded.

Furthermore, the noodle N of the first and second embodiments of the present invention is consisting of the thick portion Nb, Nb' and thin portion Nc, Nc', and therefore the noodle N is well matched with a soup. Moreover, since the thick portion and thin portion have extremely different thicknesses, the noodle N according to the invention has excellent chewiness as well as superior smoothness.

In the noodle N of the second embodiment of the invention, a thickness of the thin portion is continuously varied such that the thin portion is smoothly coupled with the thick portion owing to the curved surfaces of the small diameter portions 3c and 4c of the cutting blades. Therefore, the good feeling of hand-made noodles can be obtained and at the same time, improved taste and texture can be attained.

The cutting roll set 5, 6 of the first and second embodiments of the present invention can be easily substituted for the conventional noodle cutting roll set. Therefore, the noodles with hand-made quality can be easily produced without changing the pressing or molding roll set. That is to say, the noodle N consisting of the thick portion Nb, Nb' and thin portion Nc, Nc' can be formed only by replacing the ordinal cutting roll set by the cutting roll set having the blades each including the large diameter portion 3a, 4a and small diameter portion 3b, 4b. Further, it is also possible to change thicknesses of the thick portion and thin portion of the noodle N easily by adjusting the distance d4 between the first and second cutting rolls 5 and 6. Therefore, the distance d4 may be adjusted in accordance with fragility and thickness of the noodle belt M. For instance, when the noodle belt M has a smaller thickness, the distance d4 may be decreased. In this manner, according to the present invention, it is possible to change a cross sectional configuration of various kinds of noodles such as Soba noodles requiring a subtle quality, Chinese noodles requiring a somewhat viscosity and Udon noodles requiring a soft and smooth feeling.

In the noodles according to the invention, the thick portion Nb, Nb' and thin portion Nc, Nc' can improve outer appearance and texture of the noodles, and furthermore a boiling time period can be shortened.

In the noodles N of the second embodiment, a thickness of the thin portion is continuously changed, and therefore a looseness is improved upon being compared with the conventional noodles having uniform thickness of the comparative example.

As explained above in detail, according to the invention, it is possible to provide the noodles with a hand-made quality having excellent texture and taste. Upon eating the noodles according to the invention, the noodles might not be stuck to each other and can be easily loosened.

The present invention is not limited to the embodiments explained above, but may modifications and alternations may be conceived within the scope of the invention. For instance, in the first and second embodiments are instant, the instant dry noodles are produced, but the present invention may be applied to various kinds of noodles such as fresh noodles, boiled noodles, noodles dried with a hot air and fried instant noodles. Furthermore, in the above explained embodiments, the first and second cutting rolls 5 and 6 are arranged in opposite directions, but according to the invention, the first and second cutting rolls 5 and 6 may be arranged in the same direction. Also in this case, the second cutting roll has to be shifted in an axial direction by such a pitch that the large diameter portions 4a of the cutting blades 4 of the second cutting roll 6 face the small diameter portions 3b of the cutting blades 3 and the spacers 7 of the first cutting roll 5.

The invention claimed is:
1. An apparatus for processing noodles comprising:
a first cutting roll including a first roll shaft and a plurality of first cutting blades arranged on said first roll shaft such that first spacers formed by first circular rings are inserted between the plurality of first cutting blades and spaces of a given distance are formed between successive first cutting blades, and a second cutting roll including a second roll shaft and a plurality of second cutting blades arranged on said second roll shaft such that second spacers formed by second circular rings are inserted between the plurality of second cutting blades and spaces of a given distance are formed between successive second cutting blades, wherein said first and second cutting rolls are arranged in parallel with each other with a predetermined distance therebetween such that when a noodle belt having a given width is introduced between the first and the second cutting rolls, the noodle belt is cut into a number of noodles, each having a hand-made quality with thick and thin portions, wherein said thick and thin portions are continuously coupled with each other such that one surface of said thick portion and one surface of said thin portion are aligned to form a substantial flat surface in a longitudinal direction, wherein each of said plurality of first and second cutting blades includes a large diameter portion and a small diameter portion which has a blade diameter larger than a diameter of each of said corresponding first and second spacers, and said first and second cutting rolls are relatively shifted in an axial direction such that each of the large diameter portions of the plurality of the first cutting blades faces each of the small diameter portion of each corresponding of second cutting blade and each corresponding of said second spacer, and such that each of the large diameter portions of the plurality of second cutting blades faces the small diameter portion of each corresponding first cutting blade and each of said corresponding first spacer, and wherein said thin portions of the noodles are formed between the large diameter portions of the plurality of the first and the second cutting blades and corresponding small diameter portions of the plurality of the first and the second cutting blades and said thick portions of the noodles are formed between the large diameter portions of the plurality of the first and the second cutting blades and said corresponding first and second spacers, and wherein adjacent edges of the large diameter portions of the plurality of the first and the second cutting blades cooperate to cut the noodle belt into a number of noodles.

2. The apparatus according to claim 1, a thickness of the thick portions of the noodles is determined by outer surfaces of said first and second circular rings of said corresponding first and second spacers.

3. The apparatus according to claim 1, wherein said first and second cutting rolls are arranged such that said predetermined distance between the first and the second cutting rolls can be varied to adjust a thickness of said thin portions of the noodles.

4. The apparatus according to claim 1, wherein said large diameter portions of the plurality of the first and the second cutting blades have a cylindrical shape such that said thick portions and said thin portions of the noodles have substantially uniform thicknesses and form a steep transition step between a thick portion and a thin portion.

5. The apparatus according to claim 1, wherein said small diameter portions of the plurality of the first and the second cutting blades have a curved surface such that said thick portions of the noodles have a substantially uniform thickness and said thin portions have a non-uniform thickness which gradually increases from a minimum value at a free edge of the respective thin portion to a maximum value at a junction with the respective thick portion, said maximum value being substantially equal to the a thickness of the respective thick portion to form a smooth transition between the respective thin portion and the respective thick portion.

6. The apparatus according to claim 2, wherein said large diameter portions of the plurality of first and second cutting blades have a cylindrical shape such that said thick portions and said thin portions of the noodles have substantially uniform thicknesses and form a steep transition step between the respective thick portion and the respective thin portion.

7. The apparatus according to claim 3, wherein said large diameter portions of the plurality of the first and the second cutting blades have a cylindrical shape such that said thick portions and said thin portions of the noodles have substantially uniform thicknesses and form a steep transition step between the respective thick portion and the respective thin portion.

8. The apparatus according to claim 2, wherein said small diameter portions of the plurality of the first and the second cutting blades have a curved surface such that said thick portions of the noodles have a substantially uniform thickness and said thin portions have a non-uniform thickness which gradually increases from a minimum value at a free edge of the respective thin portion to a maximum value at a junction with the respective thick portion, said maximum value being substantially equal to a thickness of the respective thick portion to form a smooth transition between the respective thin portion and the respective thick portion.

9. The apparatus according to claim 3, wherein said small diameter portions of the plurality of the first and the second cutting blades have a curved surface such that said thick portions of the noodles have a substantially uniform thickness and said thin portions have a non-uniform thickness which gradually increases from a minimum value at a free edge of the respective thin portion to a maximum value at a junction with the respective thick portion, said maximum value being substantially equal to the thickness of the respective thick portion to form a smooth transition between the respective thin portion and the respective thick portion.

\* \* \* \* \*